(12) United States Patent
Kim et al.

(10) Patent No.: US 6,779,192 B2
(45) Date of Patent: Aug. 17, 2004

(54) DISK CLAMPING DEVICE FOR A DISK DRIVE HAVING A HUB INSERTABLE INTO A CENTRAL HOLE OF A DISK

(75) Inventors: Young Joong Kim, Seoul (KR); Kwan Woo Park, Seongnam (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 10/028,689

(22) Filed: Dec. 28, 2001

(65) Prior Publication Data

US 2002/0085481 A1 Jul. 4, 2002

(30) Foreign Application Priority Data

Dec. 28, 2000 (KR) ........................................ 2000-83493
Dec. 28, 2000 (KR) ........................................ 2000-83494

(51) Int. Cl.[7] .......................... G11B 17/28; G11B 17/03
(52) U.S. Cl. ...................................... 720/708; 720/709
(58) Field of Search ................................ 369/270, 271

(56) References Cited

U.S. PATENT DOCUMENTS 5,555,233 A * 9/1996 Yano et al. .................. 369/270
6,041,033 A * 3/2000 Otsubo et al. ............... 369/271

FOREIGN PATENT DOCUMENTS

JP            02128356 A    *  5/1990    ......... G11B/17/028

* cited by examiner

Primary Examiner—David Davis
(74) Attorney, Agent, or Firm—Birch, Stewart, Kolasch & Birch, LLP

(57) ABSTRACT

A disk clamping device for a disk drive having a hub insertable into a central hole of a disk which is capable of preventing the slip of the disk, even in a high speed rotation of the disk, by increasing the frictional force between a hub and the disk, wherein the disk clamping device includes a plurality of clamping grooves formed at the hub in a radial direction and respectively placed at regular angles and intervals centering around the hub, a plurality of springs respectively inserted into the plurality of clamping grooves, a plurality of balls respectively inserted into the plurality of clamping grooves, pushed toward the outer circumference of the hub by the plurality of springs and contacting to the disk when the hub is inserted into the central hole of the disk and a fluid provided inside the plurality of clamping grooves in order to increase the frictional force between the plurality of balls and the disk in accordance with the rotation of the disk and the hub.

6 Claims, 8 Drawing Sheets

DISK CLAMPING DEVICE FOR A DISK DRIVE HAVING A HUB INSERTABLE INTO A CENTRAL HOLE OF A DISK

BACKGROUND OF THE INVENTION

1. Field of the Invention

The present invention relates to a disk clamping device, and in particular to a disk clamping device which is capable of preventing a slip of a disk when the disk rotates at a high speed by increasing frictional force acting on the disk.

2. Description of the Conventional Art

Recently, with a need of a mass storage optical disk as an information recording and reproducing medium, densification of a disk is in progress. According to it, improving a data access speed of a CD-ROM (compact disk-read only memory) or a DVD-ROM (compact video disk-read only memory), etc. of a desktop or a portable computer is on the move. For that reason, a disk clamping device rotating at high speed comes to the fore.

FIG. 1 is a perspective view illustrating a conventional disk clamping device, FIG. 2 is a sectional view illustrating a hub of a turntable of the disk clamping device of FIG. 1 taken along the line A—A, and FIGS. 3A and 3B are state diagrams illustrating states before and after mounting a disk onto the clamping device of FIG. 1.

As depicted in FIG. 1, the conventional disk clamping device includes a spindle motor 10 as a rotational power source of a disk 30, a turntable 20 installed to the spindle motor 10 and rotating, a plurality of clamping grooves 21 formed at a hub 25 centering around a rotational axis of the hub 25 of the turntable 20 at regular angles and intervals, a plurality of springs 22 and a plurality of balls 23 respectively installed inside each clamping groove 21 for clamping the disk 30, and a circular lubber plate 24 installed at the outside of the hub 25 of the turntable 20 and contacted to the bottom surface of the disk 30.

The operation of the conventional disk clamping device will be described as below.

As depicted in FIG. 1, in a disk driver structure such as a thin optical disk player, the turntable 20 rotates by a rotational operation of the spindle motor 10.

As depicted in FIG. 3B, when the disk 30 is mounted onto the turntable 20, the hub 25 of the turntable 20 is inserted into a centrical hole 32 of the disk 30, the outer circumference 25a of the hub 25 is tightly contacted to the inner circumference 31 of the centrical hole 32 of the disk 30, accordingly the disk 30 rotates together with the turntable 20.

Herein, as depicted in FIGS. 3A and 3B, each ball 23 applied an elastic force of each spring 22 installed inside each of the three clamping grooves 21 formed centering around the rotational axis of the hub 25 of the turntable 20 at regular intervals projects over the outer circumference 25a of the hub 25 and contacts with the inner circumference 31 of the centrical hole 32 of the disk 30 in order to clamp the disk 30.

In more detail, as depicted in FIG. 2, the three clamping grooves 21 are formed at the hub 25 at regular angles (about 120°) and intervals centering around the rotational axis of the hub 25, the plurality of springs 22 respectively inserted into the three clamping grooves 21 apply pressure to the plurality of balls 23, each ball 23 applies pressure to the inner circumference 31 of the disk centrical hole 32, accordingly the clamping operation is performed.

In the meantime, in the above-mentioned structure, because a clamping force of the disk 30, namely, a frictional force acting on the disk 30 is determined only by a push force of the spring 22 applied to the ball 22, when an inertia force of the disk 30 is larger than a clamping force of the spring 22 in a high speed rotation of the disk 30, a slip of the disk 30 occurs naturally.

In order to prevent the slip, the circular lubber plate 24 is installed onto the turntable 20 in order to increase the frictional force acting on the disk 30.

However, because the circular lubber plate 24 is made of lubber materials, hardness and surface roughness of the circular lubber plate 24 are varied according to temperature and humidity. Accordingly, when the turntable 20 rotates and speeds up according to the rotation and speed-up of the spindle motor 10, the disk 30 may move in a direction opposite to the rotation direction of the turntable 20 due to an inertia force.

In addition, when a spring force is increased in order to increase a clamping force, it is difficult to mount the disk 30 onto the turntable 20, if the disk 30 is mounted by applying a pressure, the disk 30 may be deformed.

In addition, if each spring force is different, when the disk 30 is mounted and rotated, a vibration occurs due to an increase of an eccentricity of the disk 30, accordingly it is impossible to read/write the disk 30 normally.

FIG. 4 is a graph showing a natural frequency in a stop of a disk.

As depicted in FIG. 4, a natural frequency of a disk is divided into a forward traveling wave mode and a backward traveling wave mode in a rotating system, namely, in a rotation of a CD-ROM drive, etc.

FIG. 5 is a graph showing a relation between rotation speed and natural frequency.

As depicted in FIG. 5, a critical speed is between 7000~8000 rpm in a (0, 2) mode in which a natural frequency is decreased according to an increase of a rotation speed (for example: an increase of a speed of a CD-ROM). The natural frequency is increased due to characteristics of a rotating dynamic system.

In addition, the natural frequency does not increase continually, at a very high speed a flutter occurs due to a ductility problem of a fluid (air) and a solid (disk), accordingly it is impossible to read/write a disk normally.

FIG. 6 is a graph showing a flutter phenomenon according to an increase of a rotation speed of a disk and a natural frequency.

As depicted in FIG. 6, it is possible to increase a speed of an optical disk player by increasing a flutter speed, it means data can be read/written faster.

Accordingly, a flutter speed can be increased by increasing a critical speed.

Therefore, in order to increase a critical speed, a clamping force of a disk has to be increased, for that a spring force is increased in the conventional disk clamping device, however it may cause a deformation of a disk by applying excessive pressure to the disk in order to mount it onto a turntable.

SUMMARY OF THE INVENTION

In order to solve above-mentioned problems, it is an object of the present invention to provide a disk clamping device which is capable of preventing a slip of a disk in a rotation at high speed by increasing a frictional force between a hub and the inner circumference of a centrical hole of the disk.

In order to achieve the above-mentioned object, the present invention provides a disk clamping device for a disk drive having a hub insertable into a centrical hole of a disk, which includes a clamping means formed at a hub of a disk and increasing a normal force acting on the inner circumference of the disk so as to increase a frictional force between the hub and an inner surface of the disk in order to prevent a slip of the disk in accordance with rotation of the disk.

Also, the present invention provides a disk clamping device for a disk drive having a hub insertable into a centrical hole of a disk, which includes a plurality of clamping grooves formed at the hub at regular angles and intervals centering around the hub in a radial direction, a plurality of springs respectively inserted into the plurality of clamping grooves, a plurality of balls respectively inserted into the plurality of clamping grooves, pushed toward the outer circumference of the hub by the plurality of springs and contacting to the disk when the hub is inserted into the centrical hole of the disk and a fluid filled inside the plurality of clamping grooves in order to increase a frictional force between the plurality of balls and the disk in accordance with a rotation of the disk and the hub.

Also, the present invention provides a disk clamping device for a disk drive having a hub insertable into a centrical hole of a disk, which includes a plurality of clamping grooves formed at the hub at regular angles and intervals centering around the hub in a radial direction, a plurality of springs respectively inserted into the plurality of clamping grooves and a plurality of balls respectively inserted into the plurality of clamping grooves, pushed toward the outer circumference of the hub by the plurality of springs and contacting to the disk when the hub is inserted into the centrical hole of the disk, wherein angles formed by an imaginary centrical line of each clamping groove contacts and an imaginary tangent line of the hub are less than an angle of 90°, and the end of each clamping groove at the outer circumference of the hub is regularly placed centering around the hub in a radial direction.

DETAILED DESCRIPTION OF THE PREFERRED EMBODIMENT

Figure 1:
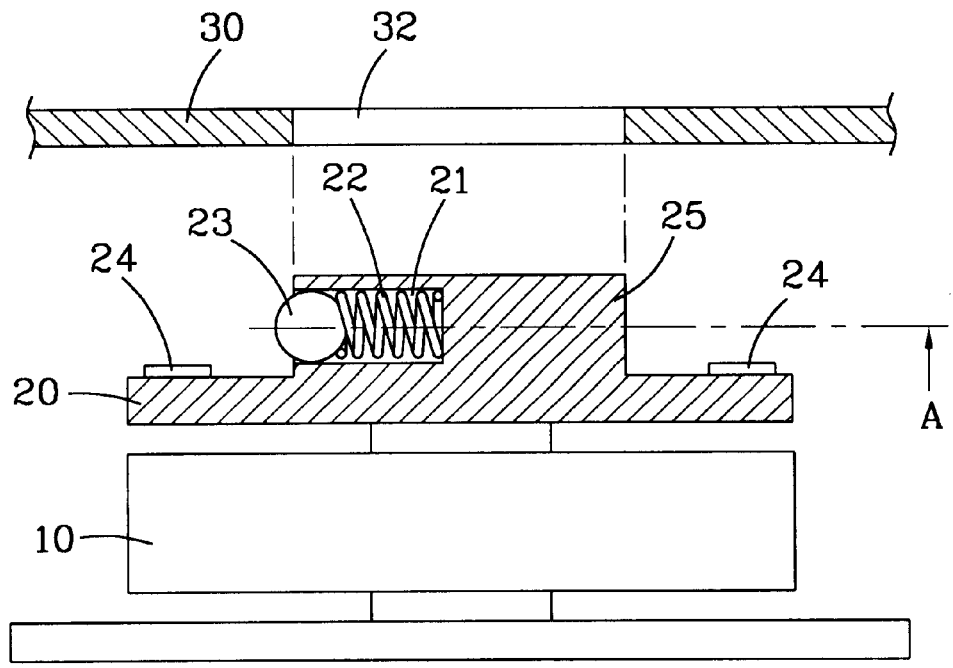
FIG. 1 is a perspective view illustrating a conventional disk clamping device.
Figure 2:
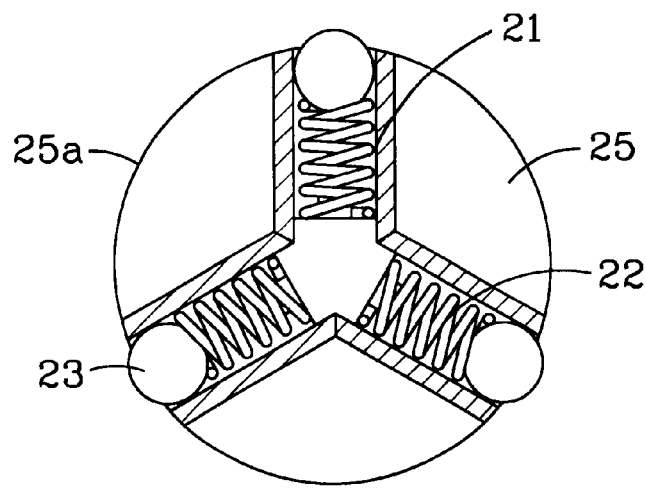
FIG. 2 is a sectional view illustrating a hub of a turntable of the disk clamping device of FIG. 1 taken along the line A—A.
Figure 3A:
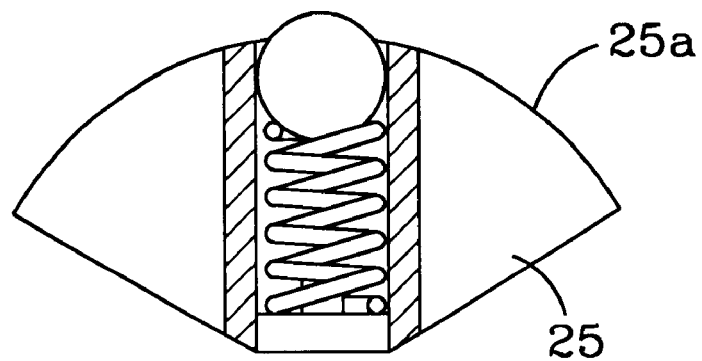
FIGS. 3A and 3B are state diagrams illustrating states before and after mounting a disk onto the clamping device of FIG. 1.
Figure 3B:
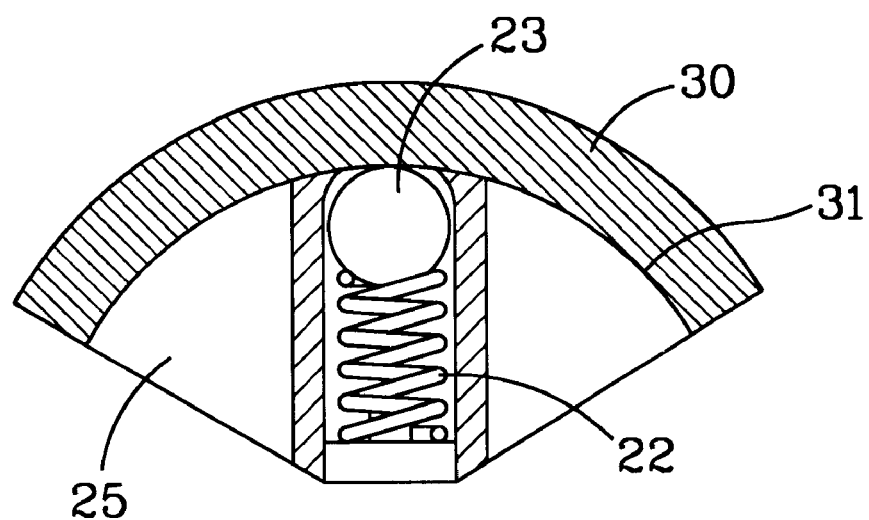
Figure 4:
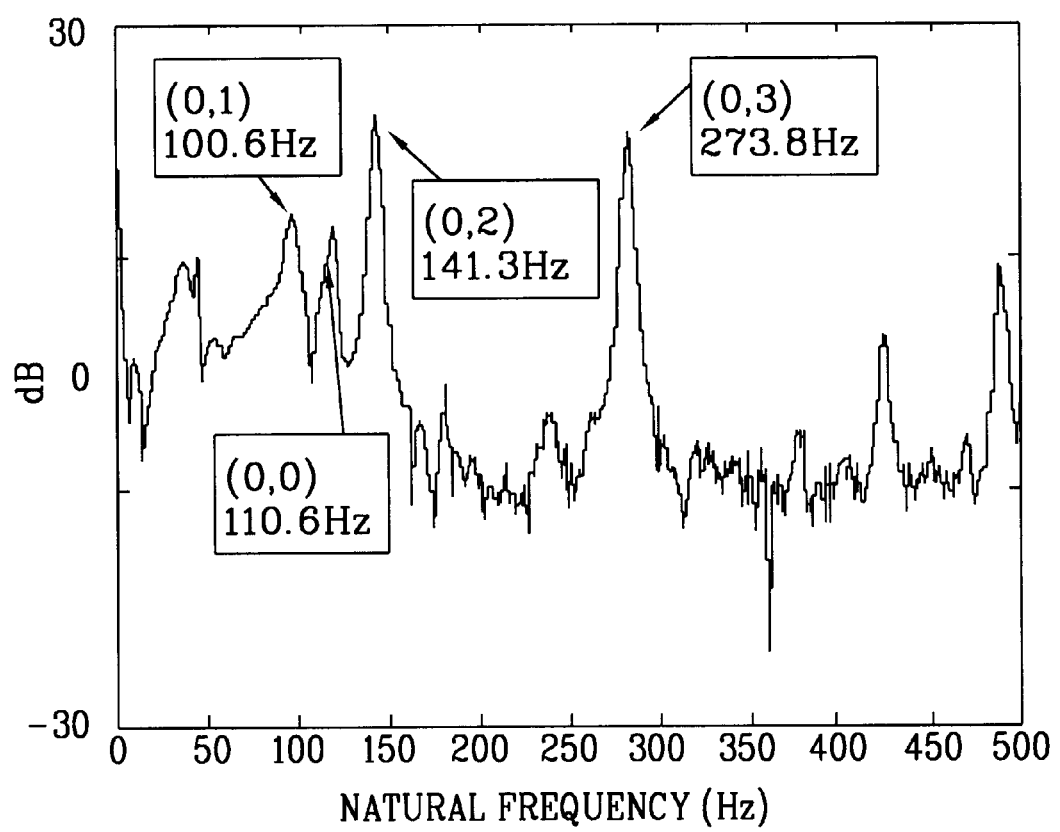
FIG. 4 is a graph showing a natural frequency in a stop of a disk.
Figure 5:
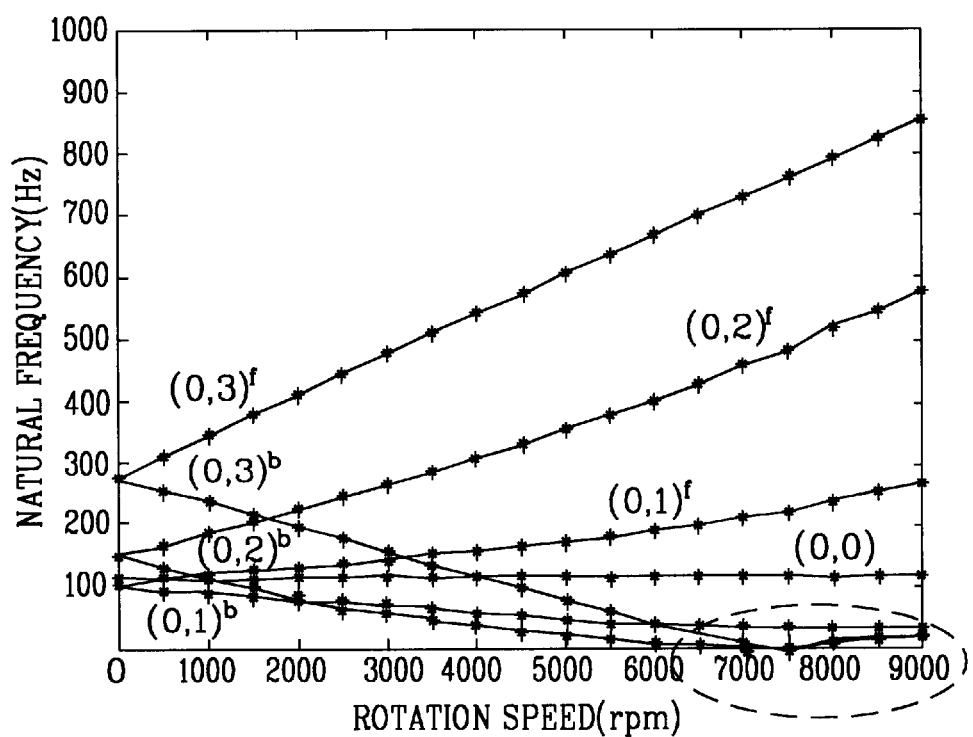
FIG. 5 is a graph showing a relation between a rotation speed and a natural frequency of a disk.
Figure 6:
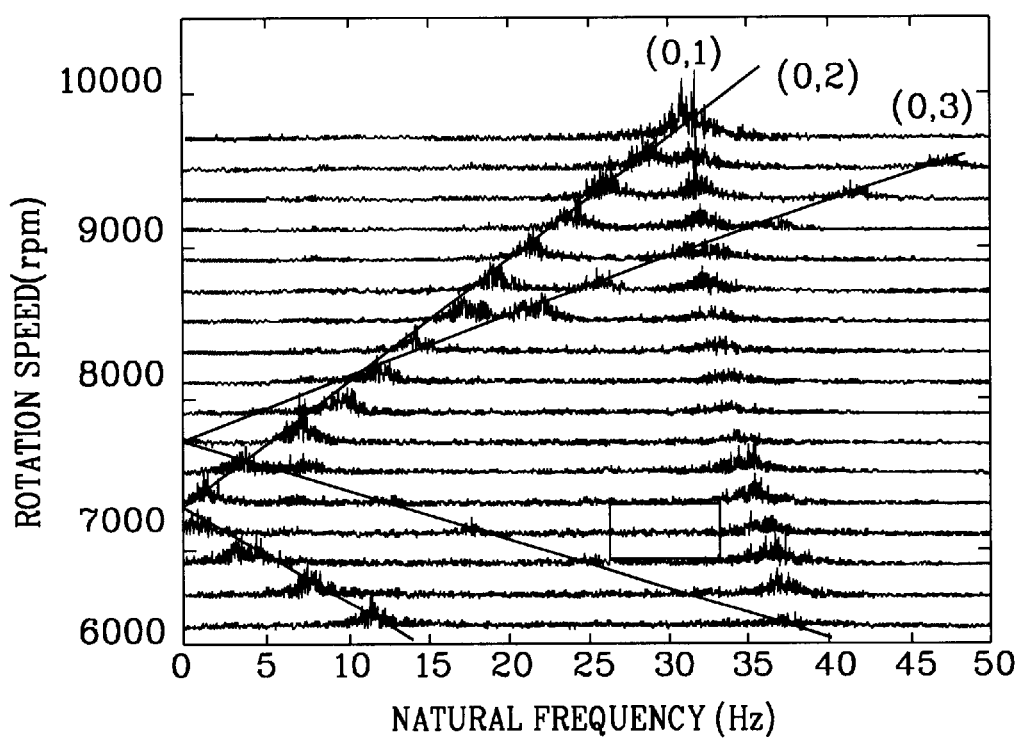
FIG. 6 is a graph showing a flutter phenomenon according to an increase of a rotation speed of a disk and a natural frequency.

Hereinafter, preferred embodiments of the present invention will be described with reference to accompanying drawings. Parts same with the prior art will have the same reference numeral.

First, a disk clamping device in accordance with the present invention for a disk drive having a hub insertable into a centrical hole of a disk, is capable of preventing a slip of a disk even in a high speed rotation of the disk by increasing a frictional force working on the disk in the rotation of the disk.

Figure 7:
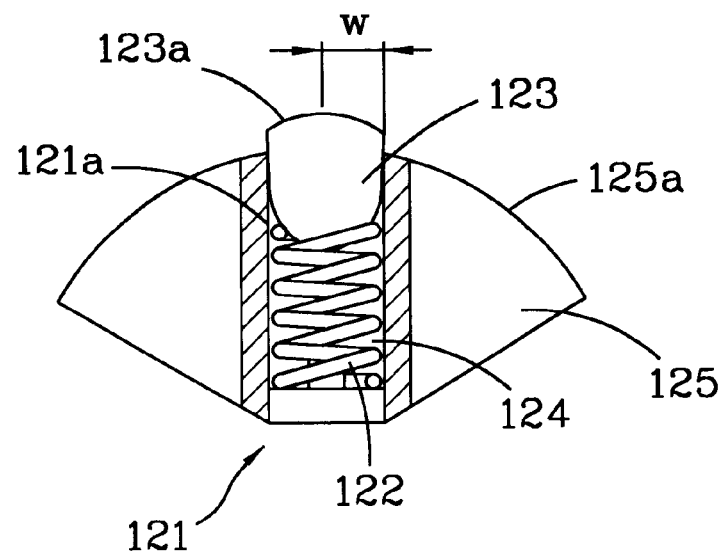
FIG. 7 is a sectional view illustrating part of a section of a disk clamping device in accordance with an embodiment of the present invention before a disk is mounted onto.
Figure 8:
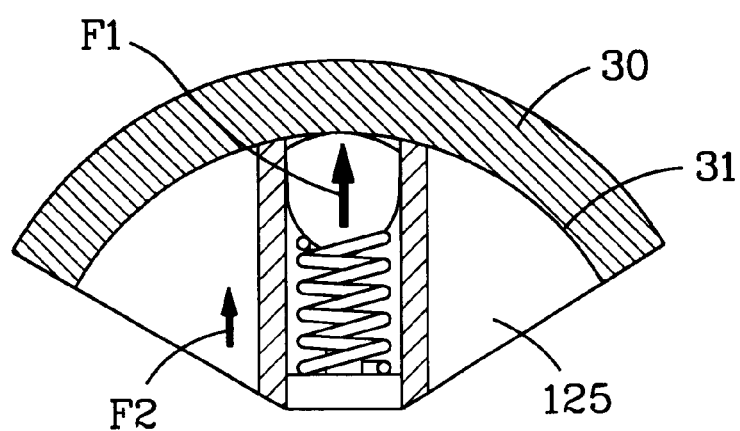
FIG. 8 is a sectional view illustrating part of a section of the disk clamping device of FIG. 7 after a disk is mounted onto.

FIG. 7 is a sectional view illustrating part of a section of a disk clamping device in accordance with an embodiment of the present invention before a disk is mounted onto, and FIG. 8 is a sectional view illustrating part of a section of the disk clamping device of FIG. 7 after a disk is mounted onto.

As depicted in FIGS. 7 and 8, a disk clamping device in accordance with an embodiment of the present invention includes a turntable 20 rotated by a spindle motor 10, a hub 125 installed to the turntable 20, a plurality of clamping grooves 121 formed at the hub 125 at regular angles and intervals centering around a rotational axis of the hub 125, a plurality of springs 122 respectively installed inside each clamping groove 121 and generating a spring force, a plurality of balls 123 respectively inserted into each clamping groove 121 and clamping the inner circumference 31 of a centrical hole 32 of a disk 30 by the spring force and a fluid 124 having a high specific gravity and filled in each clamping groove 121 in order to increase a normal force between each ball 121 and the inner circumference of the centrical hole 32 of the disk 30 by a centrifugal force according to a rotation of the disk 30.

In more detail, in order to clamp the disk 30 mounted onto the turntable 20 rotatively operated by the spindle motor 10, three clamping grooves 121 are formed in the hub 125 at an angle of 120° in a radial direction centering around the rotational axis of the hub 125, a spring 122 is installed inside each clamping groove 121, and a ball 123 is installed at one the end of the spring 122 toward the outer circumference 125a of the hub 125.

Because each ball 123 is placed between the hub 125 and the guide surface 121a of each clamping groove 121 by receiving the spring force, a breakaway of the ball 123 is prevented, and its outer surface projects out a little.

In the meantime, in order to increase a dimension (2W) contacted to the inner circumference of the centrical hole 32 of the disk 30, the outer circumference of the ball 123 is increased in comparison with the conventional art, and the fluid 124 having a high specific gravity is injected into each of the clamping grooves 121. Particularly, each ball 123 and the guide surface 121a of each clamping groove 121 are tightly contacted to each other in order to prevent a leakage of the fluid 124.

When the disk 30 is mounted onto the turntable 20, the outer circumference 125a of the hub 20 of the turntable 20 is inserted into the inner circumference of the centrical hole 32 of the disk 30, the plurality of balls 123 respectively placed at three clamping grooves 121 formed at the hub 125 at regular angles (about 120°) press the inner circumference 31 of the centrical hole 32 of the disk 30, accordingly the disk 30 can be clamped.

And, the turntable 20 rotates in accordance with the rotational operation of the spindle motor 10, and the mounted disk 30 rotates in accordance with the rotation of the turntable 20. When the spindle motor 10 rotates at a high speed, the disk 30 mounted onto the turntable 10 rotates at a high speed.

In the meantime, when the disk 30 rotates at a high speed, an inertia force making the disk 30 slip in a direction opposite to the rotational direction of the turntable 20 occurs, each ball 123 puts a clamping force on the inner circumference 31 of the centrical hole 32 of the disk 30 as a frictional force, accordingly a slip of the disk 30 can be prevented.

In more detail, the ball 123 placed inside the hub 120a and contacted to the inner circumference 31 of the centrical hole 32 of the disk 30 generates a first clamping force (F1) by the spring force, and a centrifugal force generated according to the high speed rotation of the fluid 124 filled inside each clamping groove 121 is a second clamping force (F2) acting in a radial direction of the hub 120a. Because the centrifugal force is increased in proportion to an increase of a specific gravity of the fluid, it is preferable to use a fluid having an appropriate specific gravity in consideration of other factors.

As described above, by transmitting the first clamping force (F1) according to the spring force and the second clamping force (F2) according to the centrifugal force of the fluid 124 to each ball 123, each ball 123 clamps the disk 30 by putting the clamping force (F1+F2) to the inner circumference 31 of the centrical hole 32 of the disk 30. In more detail, the frictional force acting on the disk 30 is increased by increasing normal force acting on the disk 30 in a rotation of the disk 30, a slip of the disk 30 can be prevented.

When the disk clamping force is increased, a natural frequency of the disk 30 is increased, a critical speed is increased, and a flutter speed of the disk 30 is increased. It is possible to access more stably the disk 30 rotating at a high speed.

In order to clamp the disk 30, in the hub 125 including the plurality of clamping grooves 121, the plurality of springs 122, the plurality of balls 123 and the fluid 124, only the spring force works in a stop state of the turntable 20, it is easier to mount the disk 30 onto the turntable 20, and the disk 30 is clamped stably in a high speed rotation by the spring force (F1) and the clamping force (F2) by the centrifugal force of the fluid 124.

Then, in a disk clamping device in accordance with the present invention, it is possible to maintain a system stably at a high speed operation by increasing a clamping force of the disk 30 and a flutter speed by air flow, and although an eccentric disk is mounted, an eccentricity is not increased in a high speed rotation by maintaining regularly a different spring force of each spring 122 with a constant pressure of the fluid 124.

Figure 9:
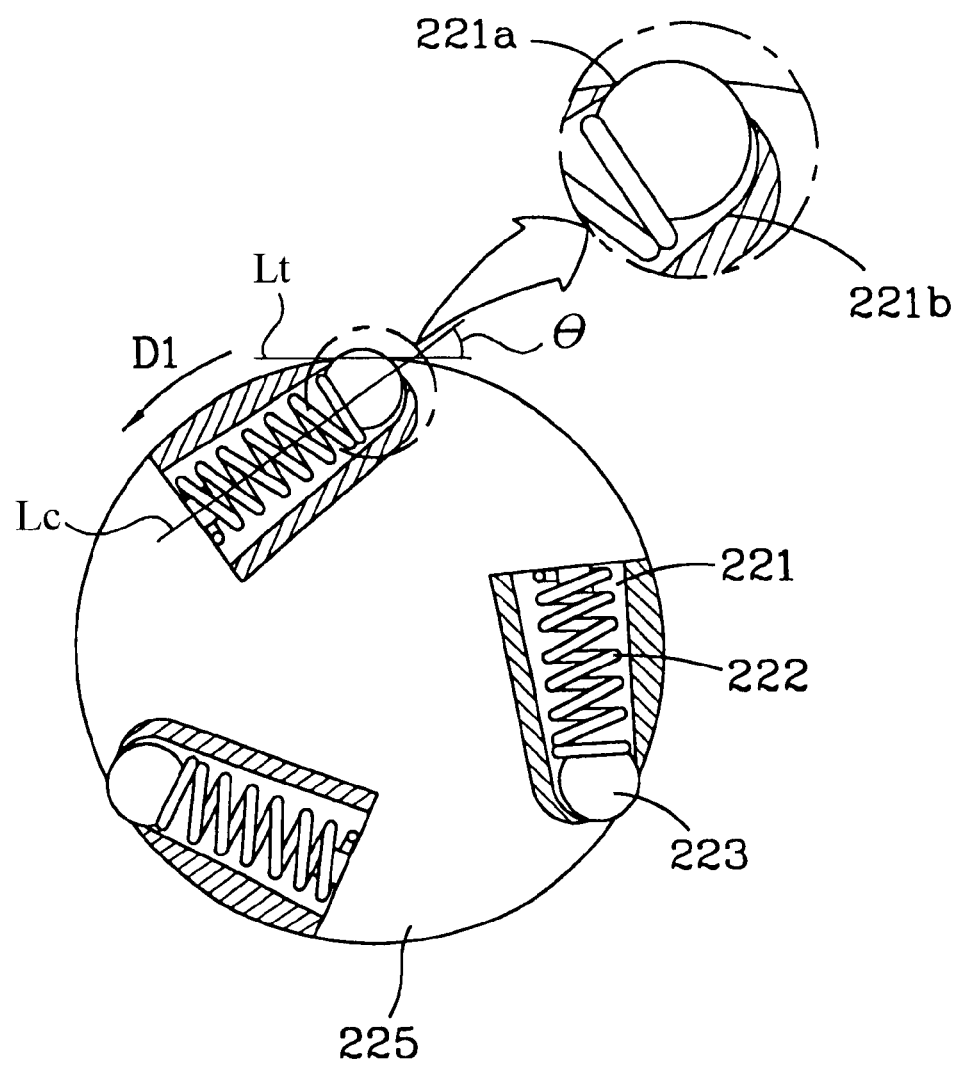
FIG. 9 is a sectional view illustrating a disk clamping device in accordance with another embodiment of the present invention.
Figure 10A:
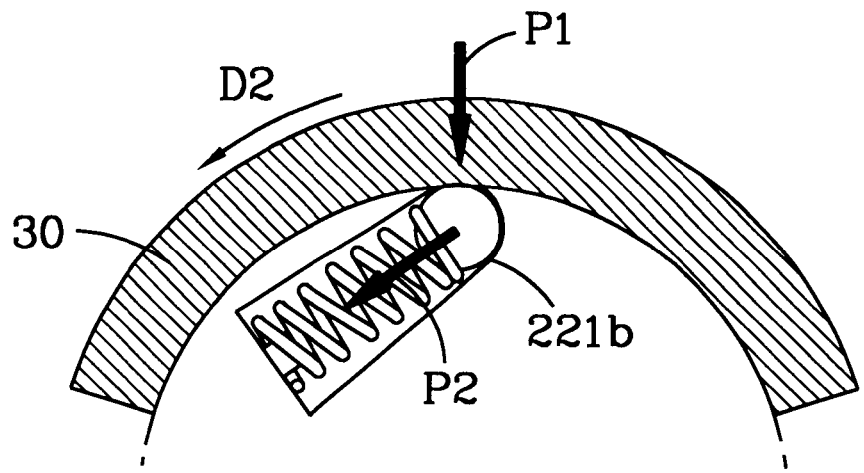
FIGS. 10A and 10B are sectional views respectively illustrating part of a section of the disk clamping device of FIG. 9 before and after a disk is mounted.
Figure 10B:
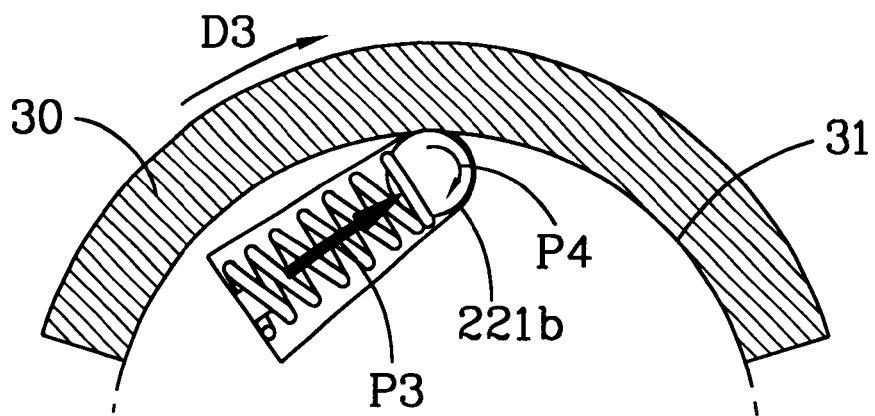

FIG. 9 is a sectional view illustrating a disk clamping device in accordance with another embodiment of the present invention, and FIGS. 10A and 10B are sectional views respectively illustrating part of a section of the disk clamping device of FIG. 9 before and after a disk is mounted onto.

As depicted in FIGS. 9, 10A and 10B, a disk clamping apparatus in accordance with another embodiment of the present invention includes a turntable 20 rotatively operated by a spindle motor 10, a plurality of clamping grooves 221 declined in the same direction from an outer circumference 225a of the hub 225 of the turntable 20, a plurality of springs 222 respectively placed inside each clamping groove 22 and transmitting a spring force to an inner circumference 31 of a centrical hole 32 of the disk 30 and the plurality of balls 123 contacting to the inner surface 31 of the centrical hole 32 of the disk 30 by the spring force.

In the meantime, as depicted in FIG. 9, each spring 222 is inserted into each clamping groove 221 formed at the hub 225 of the turntable 20, and each ball 223 is installed inside each clamping groove 221 so as to be pushed toward an outer circumference 221a of the hub 20 by the spring force of each spring 222.

Herein, each clamping groove 221 is formed at the hub 225 with a certain inclination from the outer circumference 225a of the hub 225 and has a circular cylinder shape, and its diameter is getting smaller toward the inner circumference 31 of the centrical hole 32 of the disk 30.

And, portions at which the plurality of balls 221 respectively contact to the inner circumference 31 of the centrical hole 32 of the disk 30 are installed are placed at regular angles and intervals centering around the rotational axis of the hub 225.

As depicted in FIG. 10A, when the disk 30 is mounted onto the turntable 20, the inner circumference 31 of the centrical hole 32 of the disk 30 pushes the plurality of balls 223 while the disk is inserted into the hub 225 (P1). Then, each ball 223 contacts to the disk 30 from the left guide surface 221a to the right guide surface 221b while pressurizing each spring 222 installed inside each clamping groove 221 and is pushed into the clamping groove 221 (P2).

Herein, when the disk 30 is mounted onto the turntable 20 (the hub 225 is inserted into the centrical hole 32 of the disk 30), the ball 223 is contacted to the inner circumference 31 of the hub 225, a sectional radius of each clamping groove 221 is getting larger toward the centrical portion of the hub 225, each ball 223 is easily pushed along guide surfaces 221a, 221b.

And, when a rotation speed of the turntable 20 is accelerated according to a rotation (D1) of the spindle motor 10, the disk 30 mounted onto the turntable 20 rotates in the same direction (D2) as the spindle motor 10. Herein, as depicted in FIG. 10B, when a slip of the disk 30 occurs, in more detail, a slip occurs in a direction (D3) opposite to the rotational direction (D2) of the turntable 20, each ball 223 of the hub 225 is pushed along the right guide surface 221b while rotating in a direction (P4) opposite to the rotational direction of the disk 30.

Herein, each ball 223 is placed between the inner circumference 31 of the centrical hole 32 of the disk 30 and the right guide surface 221b, a fractional force acting on the inner circumference 31 of the centrical hole 32 of the disk 30 is increased by a friction produced between each ball 223 and the right guide surface 221b and the spring force (P3).

In more detail, because a gap between the ball guide surfaces 221a, 221b is getting narrower toward the inner circumference 31 of the disk 30, the inner circumference 31 of the disk 30, the ball 223 and the disk 30 are clamped as one body, accordingly a slip of the disk 30 can be prevented.

As described above, in a disk clamping device in accordance with the present invention, by comprising a clamping means increasing a frictional force acting on a disk by acting only a spring force on the inner circumference of a centrical hole of a disk in a stop as a conventional disk clamping device and acting an additional vertical force on the inner circumference of the centrical hole of the disk besides the spring force in a rotation, it is possible to mount easily a disk onto a turntable and increase a flutter speed according to air flow, accordingly a disk recording/reproducing apparatus can be maintained stably at a high speed operation.

Particularly, in a disk clamping device in accordance with the present invention, by clamping a disk by using a clamping dimension of a ball and a centrifugal force of a fluid as concrete clamping means, a disk can be easily mounted against a spring force in a stop state. And, by increasing a clamping force at a high velocity rotation or maintaining each spring force regularly with a constant pressure of a fluid, an eccentricity of a disk is not increased even at a high velocity rotation.

In addition, in a disk clamping device in accordance with another embodiment of the present invention, because a ball guide surface declines toward the outer circumference of a hub centering around a ball for a disk clamping and the ball guide surface is getting narrower toward the ball, the ball produces a storing clamping force between the inner circumference of the centrical hole of the disk and the guide surface, it is possible to prevent a slip of the disk, accordingly a disk recording/reproducing apparatus can be maintained stably.

What is claimed is:

1. A disk clamping device for a disk drive having a hub insertable into a central hole of a disk, said disk clamping device comprising:

clamping means formed at the hub of a disk which increases the increasing a normal force acting on the inner circumference of the disk so as to increase the frictional force between the hub and the inner surface of the disk in order to prevent slipping of the disk in accordance with the rotation of the disk, and clamping means including a plurality of clamping grooves formed at the hub in the radial direction and respectively placed at regular angles and intervals centering around the hub;

a plurality of springs respectively inserted into the plurality of clamping grooves;

a plurality of balls respectively inserted into the plurality of clamping grooves, said balls being pushed toward the outer circumference of the hub by the corresponding one of said plurality of springs and contacting the disk when the hub is inserted into the central hole of the disk; and a fluid provided inside the plurality of clamping grooves in order to increase the frictional force between the plurality of balls and the disk in accordance with the rotation of the disk and the hub.

2. The device according to claim 1, wherein a portion of each ball contacting to the disk has a radius of curvature equal to the radius of the hub.

3. The device according to claim 1, a plurality of springs respectively inserted into the plurality of clamping grooves; and wherein angles formed by an imaginary center line of each clamping groove and an imaginary line tangential to the hub are less than 90°, and each end of the clamping grooves at the outer circumference of the hub is regularly placed centering around the hub in a radial direction each clamping groove having a cylindrical shape in which the sectional radius becomes smaller toward the outer circumference of the hub.

4. A disk clamping device for a disk drive having a hub insertable into a central hole of a disk, said disk clamping device comprising:

a plurality of clamping grooves formed at the hub at regular angles and intervals centering around the hub in a radial direction;

a plurality of springs respectively inserted into the plurality of clamping grooves;

a plurality of balls respectively inserted into the plurality of clamping grooves, pushed toward the outer circumference of the hub by the plurality of springs and contacting the disk when the hub is inserted into the central hole of the disk; and a fluid provided inside the plurality of clamping grooves in order to increase a frictional force between the plurality of balls and the disk in accordance with a rotation of the disk and the hub.

5. The device according to claim 4, wherein a portion of each ball contacting to the disk has a radius of curvature equal to the radius of the hub.

6. A disk clamping device for a disk drive having a hub insertable into a central hole of a disk, said disk clamping device comprising:

a plurality of clamping grooves formed at the hub at regular angles and intervals centering around the hub in a radial direction said grooves having the shape of a cylinder, a sectional radius of which decreasing toward one end of the grooves at the outer surface of the hub;

a plurality of springs respectively inserted into the plurality of clamping grooves; and a plurality of balls respectively inserted into the plurality of clamping grooves, pushed toward the outer circumference of the hub by the plurality of springs and contacting the disk when the hub is inserted into the center hole of the disk;

wherein angles formed by an imaginary center line of each clamping groove and an imaginary line tangential to the hub are less than 90°, and the end of each clamping groove at the outer circumference of the hub is regularly placed centering around the hub in a radial direction.

* * * * *